United States Patent
Wang et al.

(10) Patent No.: US 12,182,246 B2
(45) Date of Patent: Dec. 31, 2024

(54) SECURITY CHIP-BASED SECURITY AUTHENTICATION METHOD AND SYSTEM, SECURITY CHIP, AND READABLE STORAGE MEDIUM

(71) Applicant: Zhejiang Geoforcechip Technology Co., Ltd., Zhejiang (CN)

(72) Inventors: Min Wang, Hangzhou (CN); Yongyi Shang, Hangzhou (CN); Zhiye Chen, Hangzhou (CN)

(73) Assignee: Zhejiang Geoforcechip Technology Co., Ltd., Zhejiang (CN)

( * ) Notice: Subject to any disclaimer, the term of this patent is extended or adjusted under 35 U.S.C. 154(b) by 319 days.

(21) Appl. No.: 17/773,482

(22) PCT Filed: Oct. 30, 2020

(86) PCT No.: PCT/CN2020/125387
§ 371 (c)(1),
(2) Date: Apr. 29, 2022

(87) PCT Pub. No.: WO2021/083349
PCT Pub. Date: May 6, 2021

(65) Prior Publication Data
US 2023/0289424 A1  Sep. 14, 2023

(30) Foreign Application Priority Data

Nov. 1, 2019 (CN) .......................... 201911061696.8
Nov. 1, 2019 (CN) .......................... 201911061728.4

(51) Int. Cl.
G06F 21/00 (2013.01)
G06F 21/34 (2013.01)
G06F 21/60 (2013.01)

(52) U.S. Cl.
CPC ............ *G06F 21/34* (2013.01); *G06F 21/602* (2013.01)

(58) Field of Classification Search
CPC ............................... G06F 21/34; G06F 21/602
See application file for complete search history.

(56) References Cited

U.S. PATENT DOCUMENTS

| 2014/0281560 A1 | 9/2014 | Ignatchenko et al. |
| 2015/0256343 A1* | 9/2015 | Graveman ............ H04L 9/3242 713/183 |

(Continued)

FOREIGN PATENT DOCUMENTS

| CN | 102006306 A | 4/2011 |
| CN | 103336919 A | 10/2013 |

(Continued)

OTHER PUBLICATIONS

International Search Report and Written Opinion from Application No. PCT/CN2020/125387 (with English Translation of Search Report).

(Continued)

*Primary Examiner* — Jeffrey C Pwu
*Assistant Examiner* — Thong P Truong
(74) *Attorney, Agent, or Firm* — Troutman Pepper Hamilton Sanders LLP; Scott A. Bergeson

(57) ABSTRACT

A security chip-based security authentication method and system, a security chip, and a readable storage medium are provided. The security authentication method includes: a security chip sending a key acquisition request to an auxiliary chip in response to a security authentication request sent by an upper computer; the auxiliary chip sending, to the security chip, first ciphertext data formed by encrypting a security key in response to the key acquisition request; the security chip decrypting the first ciphertext data to obtain the (Continued)

security key, and performing security authentication with the upper computer in combination with code table data stored on the chip. The security key and the code table data required for security authentication are respectively stored into the security chip and the auxiliary chip.

18 Claims, 6 Drawing Sheets

(56) References Cited

U.S. PATENT DOCUMENTS

| | | | | |
|---|---|---|---|---|
| 2019/0179394 A1* | 6/2019 | Kim | .................. | G06F 1/3206 |
| 2019/0253890 A1 | 8/2019 | Zhuang et al. | | |

FOREIGN PATENT DOCUMENTS

| | | | |
|---|---|---|---|
| CN | 103763469 | A | 4/2014 |
| CN | 104866757 | A | 8/2015 |
| CN | 105516180 | A | 4/2016 |
| CN | 106330455 | A | 1/2017 |
| CN | 107493281 | A | 12/2017 |
| CN | 108234132 | A | 6/2018 |
| CN | 108377190 | A | 8/2018 |
| CN | 108540486 | A | 9/2018 |
| CN | 108667608 | A | 10/2018 |
| CN | 109067814 | A | 12/2018 |
| CN | 109086588 | A | 12/2018 |
| CN | 109768862 | A | 5/2019 |
| CN | 110321678 | A | 10/2019 |
| CN | 110889123 | A | 3/2020 |
| CN | 110909338 | A | 3/2020 |
| CN | 210515295 | U | 5/2020 |

OTHER PUBLICATIONS

Search report from priority Application No. 201911061696.8.
Search report from priority Application No. 201911061728.4.
Notifications of grant of priority application No. 201911061728.4.
Office Action from Chinese priority application No. 201911061728.4 (7 pages including English translation).
Office Action from Chinese priority application No. 201911061696.8 (13 pages including English translation).
Supplementary Office Action from Chinese priority application No. 201911061696.8 (14 pages including English translation).
Notification to Grant Patent Right for Invention of priority application CN201911061696.8, dated Aug. 9, 2022.
Supplementary search of priority application CN201911061696.8, dated Sep. 18, 2024.

* cited by examiner

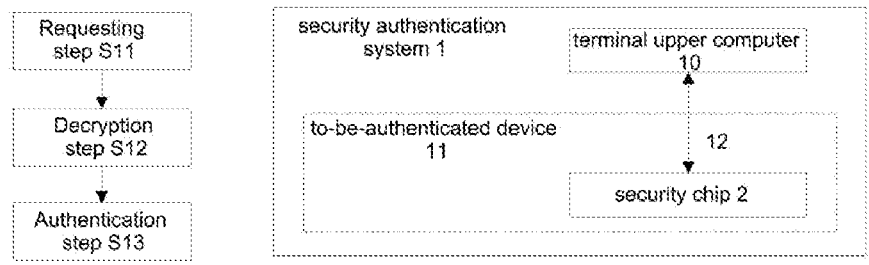
FIG. 6
FIG. 7
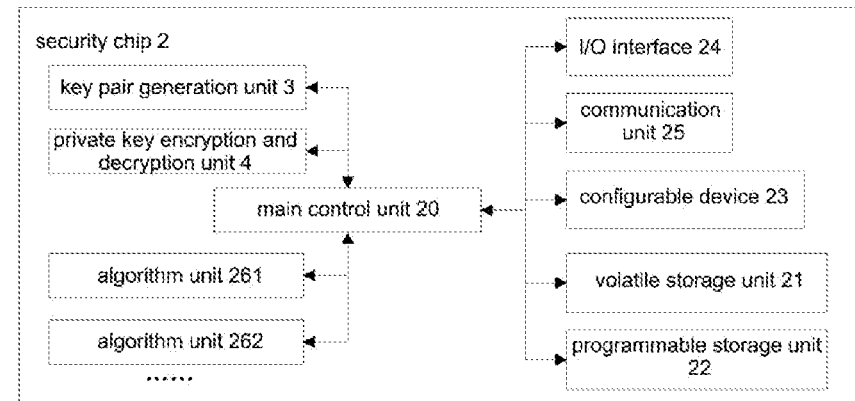
FIG. 8
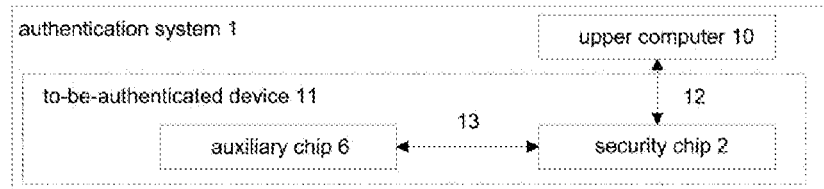
FIG. 12
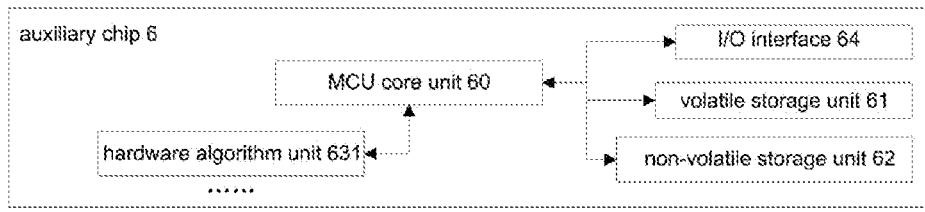
FIG. 13

SECURITY CHIP-BASED SECURITY AUTHENTICATION METHOD AND SYSTEM, SECURITY CHIP, AND READABLE STORAGE MEDIUM

CROSS REFERENCE TO RELATED APPLICATIONS

This application is a U.S. National Stage of International Patent Application No. PCT/CN2020/125387, filed 30 Oct. 2020, entitled "Security Chip-Based Security Authentication Method and System, Security Chip, and Readable Storage Medium", which claims priority to Chinese Patent Application No. 201911061696.8, filed 1 Nov. 2019, and Chinese Patent Application No. 201911061728.4 filed 1 Nov. 2019 the contents of both are all fully incorporated herein by reference.

TECHNICAL FIELD

The present application relates to the technical field of security communication, in particular to a security authentication method and system based on a security chip, and a security chip.

BACKGROUND ART

In the technical field of security communication, in order to provide the reliable security communication protection for the Internet of Things (IoT) markets, such as home automation, industrial networking, accessories and consumables verification, medical care, and mobile communication, many manufacturers have adopted the security chip with encryption strategy and security authentication functions, so as to effectively offer the excellent confidentiality, data integrity and identity verification functions for those systems in which the MCU or MPU runs in the software the encryption/decryption algorithms, such as ECC and so on.

FIG. 1 shows the basic structure of the security chip 2, which mainly comprises a MCU core unit 20, a volatile storage unit 21, a non-volatile storage unit 22, a high-speed hardware algorithm unit 231, a high-speed hardware algorithm unit 232, a high-speed hardware arithmetic unit 233, a I/O interface 24, and the like, as basic units. Herein, the MCU core unit 20 is mainly used for internal control and operation of the chip, and is usually a general-purpose MCU core, such as MSP430 and CORTEX-MO, etc. The volatile storage unit 21 is mainly used for storing temporary data, such as input data of hardware algorithm modules or the data generated during the operation of the chip program, specifically SRAM. The non-volatile storage unit 22 comprises ROM and FLASH, wherein ROM is used to store BOOT programs, and FLASH is used to store the internal software data of the chip. The high-speed hardware algorithm units are used for using hardware to implement the complex security authentication algorithms, such as encryption and decryption modules of AEA, AES, DES and the like. The I/O interface is used for the communication between the security chip and the upper computer.

In the working process, usually, a communication authentication process exists in the communication between the security chip and the upper computer, which involves a large number of calculations of the security authentication algorithms. Common security algorithms include the ECC encryption/decryption algorithm, the DES encryption/decryption algorithm, the DSA signature algorithm, the ECDSA signature algorithm, etc., and the operations of these security authentication algorithms are implemented by a dedicated hardware module embedded in the chip.

In order to be able to perform the secure communication, a physical/software encryption design is adopted inside the security chip to protect the on-chip program, so that the program inside the chip cannot be directly read by the programmer to protect the program. However, external attackers can choose to observe the process of the communication authentication, use the energy analysis attacks or the special equipment or self-made equipment, and exploit the vulnerabilities or software flaws in the security chip design, to break through the encryption protection of the chip by means of various technical means, such as FIB. However, extracting the key information from inside of the chip and obtaining the software programs and the security authentication keys seriously affect the information security.

At least based on the foregoing, there is a need to improve the structure and/or data processing process of a security chip and/or a security authentication device based on a security chip and the like, so as to improve the information security.

In addition, in the process of improving the structure and/or information processing process of the security chip and/or the information processing device based on the security chip, relevant costs need to be considered, especially for a start-up enterprise.

SUMMARY

The main purpose of the present application is to provide a security chip and its information processing method, security authentication method, system and computer readable storage medium, to improve the information security.

In order to achieve the above main purpose, the present application provides a security authentication method based on a security chip including the following steps of: (1) the security chip sending a key acquisition request to an auxiliary chip in response to a security authentication request sent by an upper computer; (2) the auxiliary chip sending to the security chip a first ciphertext data formed by encrypting the security key, in response to the key acquisition request; and (3) the security chip decrypting the first ciphertext data to obtain the security key, and performing a security authentication with the upper computer in combination with code table data stored on the security chip.

The security key in the key data required for the security authentication and the code table data are stored separately, and stored correspondingly in the storage units of the two chips, and the communication and the data transmission with the upper computer are performed based on the security chip. When it is necessary to perform the action of security identity authentication with the upper computer, the security chip obtains, from the auxiliary chip, by means of encryption, the ciphertext data which is formed by encrypting the security key, and obtains the security key by decryption, so as to perform the security identity authentication in combination with the code table data stored in the secure chip. That is, the security authentication method of the present application is based on a two-chip design. Even if one of the chips is cracked, it is difficult to obtain all the key data, so as to increase the cracking cost of chips and effectively improve the information security.

In the specific technical solution, the auxiliary chip firstly encrypts the security key stored in it to form the first ciphertext data, and then sends the first ciphertext data to the security chip. The encryption key required for generating the first ciphertext data can be determined on the side of the security chip, which effectively improves the transmission security of the first ciphertext data.

In a preferred technical solution, the step of sending the key acquisition request to the auxiliary chip comprises: the security chip sending a wake-up instruction to the auxiliary chip for waking up the auxiliary chip in the dormant state; and the auxiliary chip sending response information to the security chip in response to the wake-up instruction. Since the communication with the upper computer and other tasks are completed by the security chip, the auxiliary chip can be set to be dormant to reduce the overall power consumption.

In a further technical solution, after receiving the response information, the security chip generates the first random number, encrypts the first random number using the pre-stored symmetric key to form the second ciphertext data, and sends it to the auxiliary chip; the auxiliary chip uses the pre-stored symmetric key to decrypt the second ciphertext data to obtain the first random number, and then use the first random number as the symmetric key to encrypt the security key to form the first ciphertext data. The step of decrypting the first ciphertext data includes using the first random number as a symmetric key to decrypt the first ciphertext data. The key of each encryption of the security key is constructed with a random number, which can improve its information security, and at the same time, the symmetric encryption method is used for the encryption, which reduces the amount of calculation.

In the preferred technical solution, the step of sending the key acquisition request to the auxiliary chip comprises sending second ciphertext data to the auxiliary chip. The second ciphertext data is generated by the security chip using a pre-stored symmetric key to encrypt the first random number. The first random number is a random number which is generated by the security chip after receiving the security authentication request. The auxiliary chip uses the pre-stored symmetric key to decrypt the second ciphertext data to obtain the first random number, and then uses the first random number as the symmetric key to encrypt the security key to form the first ciphertext data. The step of decrypting the first ciphertext data comprises using the first random number as the symmetric key to decrypt the first ciphertext data. The key of each encryption of the security key is constructed using a random number, which can improve its information security, and at the same time, the symmetric encryption method is used for encryption to reduce the amount of calculation.

In the preferred technical solution, the auxiliary chip is a general-purpose chip. The general-purpose chip is used to construct the auxiliary chip, which can effectively reduce equipment costs, and that is, existing security chip products can be modified for the construction, effectively reducing costs.

In the preferred technical solution, the auxiliary chip automatically enters the dormant state after sending the first ciphertext data, or the auxiliary chip enters the dormant state after receiving the security authentication completion confirmation message or the dormant instruction sent by the security chip. Further, the overall power consumption is optimized.

In order to achieve the above main objectives, the security authentication device provided by the present application comprises a security chip and an auxiliary chip coupled with the security chip. The auxiliary chip comprises a control unit and a ciphertext supply unit for providing the first ciphertext data which is formed by encrypting the security key. The security chip comprises a control unit, a non-volatile storage unit for storing code table data, a hardware algorithm unit for decrypting the first ciphertext data sent by the auxiliary chip, and a volatile storage unit for temporarily storing and decrypting the obtained security key.

The security key in the key data required for the security authentication and the code table data are stored separately, and stored correspondingly in the storage units of the two chips, so that the security chip can be used to communicate and transmit data with the upper computer during the work process. And, when it is necessary to conduct behavior of the security identity authentication with the upper computer, the security chip obtains, from the auxiliary chip, through encryption, the ciphertext data which is formed by encrypting the security key, and decrypts it to obtain the security key, so as to perform the security identity authentication, in combination with the code table data stored in the security chip. That is, in this security authentication method, based on a dual-chip design, even if one of the chips is cracked, it is difficult to obtain all the key data, so as to increase the cost for cracking chips and effectively improve the information security.

In the specific technical solution, the ciphertext supply unit comprises a non-volatile storage unit for storing the security key, and a hardware algorithm unit for encrypting the security key to form the first ciphertext data. The encryption key required for generating the first ciphertext data can be determined on the side of the security chip, which effectively improves the transmission security of the first ciphertext data.

In a more specific solution, the hardware algorithm unit comprises a symmetric hardware algorithm unit. The security chip comprises a random number generation unit for generating a first random number. The symmetric hardware algorithm unit of the security chip is used for symmetrically encrypting the first random number to form a second ciphertext data. The symmetric hardware algorithm unit of the auxiliary chip is used to decrypt the second ciphertext data to form the first random data. The hardware algorithm unit of the auxiliary chip uses the first random number as the symmetric key to encrypt the security key to form the first Ciphertext data. The hardware algorithm unit of the security chip uses the first random number as a symmetric key to decrypt the first ciphertext data. The key of each encryption of the security key is constructed using a random number, which can improve its information security, and at the same time the symmetric encryption method is used for encryption, which can effectively reduce the amount of calculation required for encryption and decryption.

In the preferred technical solution, the auxiliary chip is a general-purpose chip. The general-purpose chip is used to construct the auxiliary chip, which can effectively reduce equipment costs. The existing security chip products can be modified for the construction, effectively reducing costs.

In order to achieve the above main purpose, the security authentication system provided by the present application comprises an upper computer and a security authentication device coupled with the upper computer. The security authentication device is the security authentication device described in any of the above technical solutions, and the security chip is coupled to the upper computer.

In order to achieve the above main objectives, the security authentication device provided by the present application comprises a security chip and an auxiliary chip. The security chip comprises a processor and a memory. The memory stores computer programs. When the computer programs are executed by the processor, the steps of the security authentication method described in any of the above technical solutions can be realized.

In order to achieve the above main purpose, the information processing method of the security chip provided by the present application comprises the following steps: (1) a requesting step, of sending, based on the received information processing request sent by the upper computer, a key acquisition request to the auxiliary chip; 2) a receiving step, of receiving the first ciphertext data which is sent by the auxiliary chip in response to the key acquisition request, wherein the first ciphertext data is generated by encrypting the security key; and (3) the processing step, of performing the decryption processing on the first ciphertext data and performing the information processing based on the security key obtained by decryption.

The security key required by the security chip when processing information is stored in an additional auxiliary chip, and other data required for the information processing can be stored in the security chip, such as the key required for decrypting the first encrypted data. And, the auxiliary chip and the security chip communicate with each other in an encrypted manner, and can independently use the security chip to communicate with the upper computer, so that in the process of information processing, the security key is obtained from the auxiliary chip by means of encryption, which effectively improves the information security in the process of information processing using the security chip.

In the specific technical solution, the first ciphertext data is formed by encrypting a security key stored in the auxiliary chip.

In a preferred technical solution, the step of sending the key acquisition request to the auxiliary chip comprises sending a wake-up instruction to the auxiliary chip for waking up the auxiliary chip in the dormant state, which reduces the power consumption of the auxiliary chip in the working process.

In a further technical solution, the requesting step comprises generating a first random number after receiving the response information which is sent by the auxiliary chip for the wake-up instruction, encrypting the first random number using a pre-stored symmetric key, and sending it to the auxiliary chip, wherein the first ciphertext data is the ciphertext data which is encrypted with a first random number as a symmetric key, and the step of decrypting the first ciphertext data comprises using the first random number to decrypt the first ciphertext data.

In the preferred technical solution, the step of sending the key acquisition request to the auxiliary chip comprises sending second ciphertext data to the auxiliary chip. The second ciphertext data is generated by the security chip using a pre-stored symmetric key to encrypt the first random number. The first random number is a random number generated by the security chip after receiving the information processing request. The auxiliary chip uses the pre-stored symmetric key to decrypt the second ciphertext data to obtain the first random number, and then uses the first random number as the symmetric key to encrypt the security key to form the first ciphertext data. The step of decrypting the first ciphertext data comprises using the first random number as the symmetric key to decrypt the first ciphertext data.

In the preferred technical solution, the auxiliary chip is a general-purpose chip, lowering the cost.

In a preferred technical solution, the information processing request is a security authentication request. The step of performing the information processing based on the security key obtained by decryption comprises performing the security authentication processing based on the security key and code table data which is stored in the security chip. The security key in the key data required for security authentication is stored separately from the code table data, which increases the overall difficulty of cracking chips and effectively improves the information security in the security identity authentication process.

In order to achieve the above main purpose, the security chip provided by the present application comprises a requesting unit, a receiving unit, and a processing unit. The requesting unit is used to send a key acquisition request to the auxiliary chip after receiving the information processing request sent by the upper computer. The receiving unit is used to receive the first ciphertext data which is sent by the auxiliary chip in response to the key acquisition request, wherein the first ciphertext data is generated by encrypting the security key. The processing unit is used to decrypt the first ciphertext data, and perform the information processing based on the security key obtained by decryption.

In the specific technical solution, the first ciphertext data is formed by encrypting a security key stored in the auxiliary chip.

In a preferred technical solution, the requesting unit is used to send a wake-up instruction to the auxiliary chip, and the wake-up instruction is used to wake up the auxiliary chip in a dormant state.

In a further technical solution, the requesting unit is configured to generate a first random number after receiving the response information which is sent by the auxiliary chip for the wake-up instruction, encrypt the first random number using a pre-stored symmetric key, and send it to the auxiliary chip. The first ciphertext data is the ciphertext data which is encrypted with the first random number as the symmetric key. The processing unit is configured to decrypt the first ciphertext data based on the first random number as the symmetric key.

In the preferred technical solution, the security chip comprises a random number generation unit for generating the first random number, and an encryption algorithm unit for symmetrically encrypting the first random number to form the second ciphertext data. The requesting unit is used for sending the second ciphertext data to the auxiliary chip. The first ciphertext data is generated in the way that the auxiliary chip decrypts the second ciphertext data based on the symmetric key pre-stored therein to obtain the first random number and encrypts the security key stored therein based on the first random number. The processing unit is configured to use the first random number as the symmetric key to decrypt the first ciphertext data.

In the preferred technical solution, the auxiliary chip is a general-purpose chip.

In the preferred technical solution, the information processing request is a security authentication request; and the processing unit is used to perform security authentication processing based on the security key and the code table data, the code table data being stored in the security chip.

In order to achieve the above main purpose, the authentication method based on the security chip provided by the present application is used for the security authentication between the device to be authenticated and the upper computer. The device to be authenticated comprises the current configurable device and the current memory which stores the ciphertext private key, the ciphertext public key and the current configuration data. The ciphertext private key is generated by encrypting the private key in the key pair, the configuration data stored in the device memory during encryption, and the inherent device parameters of the configurable device on the device. The ciphertext public key is generated by another encryption processing device encrypting the public key in the key pair. The authentication method comprises the following steps: (1) the upper computer sending an authentication request to the device to be authenticated; (2) the device to be authenticated performing decrypting to generate the current private key in response to the authentication request, based on the ciphertext private key, the current configuration data and the inherent device parameters of the current configurable device, and sending the data to be verified and the ciphertext public key to the upper computer, wherein the data to be verified is generated by calculating the target data with the current private key as the password, the device to be authenticated comprises a security chip and an auxiliary chip controlled by the security chip, the ciphertext private key and the ciphertext public key are stored in the programmable memory of the security chip, the configuration data is stored in the programmable memory of the auxiliary chip, and the security chip obtains the configuration data from the auxiliary chip by means of encryption; and (3) the upper computer decrypting the ciphertext public key to generate a public key, and performing the security authentication based on whether the public key matches the data to be verified.

In this authentication method, the key pair required for authentication is not directly stored, but the private key and the public key in the key pair are encrypted respectively to form a ciphertext private key and a ciphertext public key, which are then stored in the memory of the device to be authenticated. And, the ciphertext public key is not encrypted in the device to be authenticated, but is encrypted by the upper computer used by encryption of the public key and then stored in the programmable memory of the chip of the device to be authenticated, and the decryption during the authentication process is performed by the decryption algorithm stored in the terminal upper computer having the aforementioned public key encryption algorithm. As for the private key, the configuration data on the device to be verified and the inherent device parameters of the configurable device are used in each of the encryption process and the decryption process. That is, the physical parameters of the device to be authenticated and the internal data information are bundled, and the positions of the configuration data and the configurable device can be multiple, that is, only when the devices to be authenticated at the two time points of encryption and decryption are consistent, the private key required for the required subsequent data processing, increasing the difficulty of cracking the overall chip, thereby effectively avoiding the cost of brute force cracking by third-party companies. In addition, based on the dual-chip design, even if one of the chips is cracked, it is difficult to obtain all the data required for decryption, so as to increase the cost of cracking chips and effectively improve the information security.

In the specific technical solution, the steps of obtaining configuration data from the auxiliary chip by means of encryption include: (1) the security chip sending a configuration data acquisition request to the auxiliary chip in response to the authentication request; (2) the auxiliary chip sending, in response to the configuration data acquisition request, to the security chip the third ciphertext data which is generated by symmetrically encrypting the configuration data; and (3) the security chip using the pre-stored symmetric key to decrypt the third ciphertext data to obtain the configuration data. The encryption and decryption using the symmetric algorithms can effectively reduce the amount of calculation.

In order to achieve the above-mentioned main purpose, the computer-readable storage medium provided by the present application stores computer programs for the security authentication between the device to be authenticated and the upper computer. When the computer programs are executed, the security authentication method described in any of the above technical solutions can be realized.

BRIEF DESCRIPTION OF DRAWINGS

FIG. 6 is a working flow chart of the security authentication method in Embodiment 5 of the present application;

FIG. 7 is a structural block diagram of the circuit principle of the security authentication system in Embodiment 5 of the present application;

FIG. 8 is a structural block diagram of the circuit principle of the security chip in Embodiment 5 of the present application;

FIG. 12 is a structural block diagram of the circuit principle of the security authentication system in Embodiment 5 of the present application; and FIG. 13 is a structural block diagram of the circuit principle of the auxiliary chip in Embodiment 5 of the present application.

DETAILED DESCRIPTION OF EMBODIMENTS

The present application will be further described below in conjunction with the embodiments and the drawings.

Embodiment 1

Figure 1:
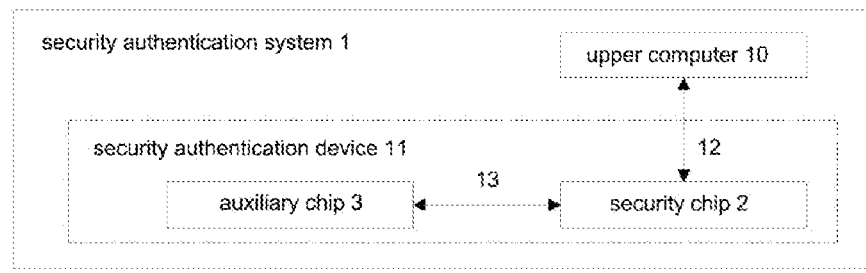
FIG. 1 is a structural block diagram of the circuit principle of a security authentication system in an embodiment of the present application.

Referring to FIG. 1, the security authentication system 1 of the present application comprises an upper computer 10 and a security authentication device 11 coupled to the upper computer 10, and the security authentication device 11 comprises a security chip 2 coupled to the upper computer 10 and an auxiliary chip 3 coupled to the security chip 2.

Figure 2:
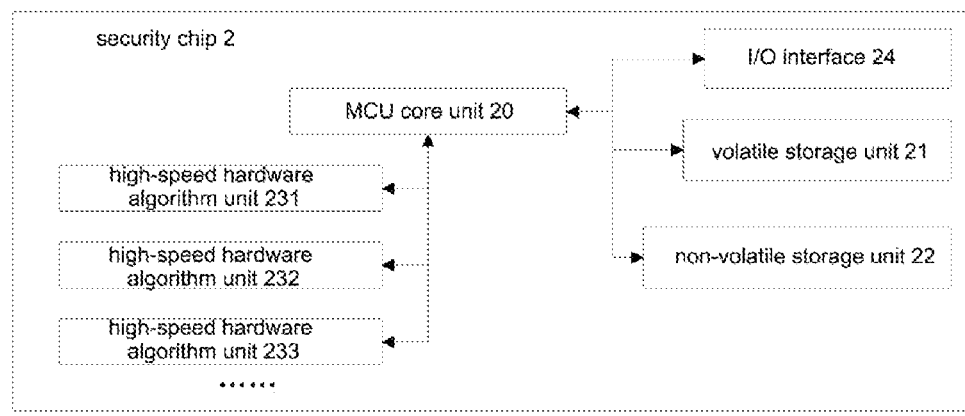
FIG. 2 is a structural block diagram of the circuit principle of a security chip in an embodiment of the present application.

Referring to FIG. 2, the security chip 2 comprises an MCU core unit 20, a volatile storage unit 21, a non-volatile storage unit 22, an I/O interface 24, and a high-speed hardware algorithm unit, wherein the high-speed hardware algorithm unit comprises plural high-speed hardware algorithm units, such as, a high-speed hardware algorithm unit 231, a high-speed hardware algorithm unit 232 and a high-speed hardware algorithm unit 233, etc. The MCU core unit 20, which is mainly used for internal control and operation of the chip, is usually a general-purpose MCU core, such as MSP430 and CORTEX-M0, etc. The volatile storage unit 21 is mainly used for storing temporary data, such as the input data of the hardware algorithm module or the data which is generated during operation of the chip program, which the SRAM is selected and used specifically. The non-volatile storage unit 22 comprises ROM and FLASH, wherein ROM is used to store the BOOT program, and FLASH is used to store the internal software data of the chip. The high-speed hardware algorithm units are used for the hardware implementation of the complex security authentication algorithms, such as, encryption and decryption modules such as AEA, AES, DES, etc. The I/O interface 24 is used for the communication between the security chip 2 and the upper computer 10 and the communication between the security chip 2 and the auxiliary chip 3.

Figure 3:
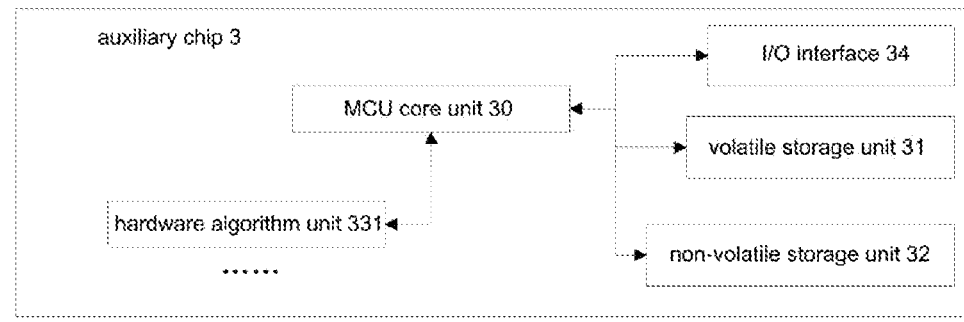
FIG. 3 is a structural block diagram of the circuit principle of an auxiliary chip in an embodiment of the present application.

Referring to FIG. 3, the auxiliary chip 3 comprises an MCU core unit 30, a volatile storage unit 31, a non-volatile storage unit 32, an I/O interface 34, and more than one hardware algorithm unit 331. The MCU core unit 30, which is mainly used for the internal control and operation of the chip, is usually a general-purpose MCU core, such as MSP430 and CORTEX-M0 etc. The volatile storage unit 31 is mainly used for storing temporary data, such as, the input data of the hardware algorithm module or the data which is generated during operation of the chip program, and specifically is SRAM. The non-volatile storage unit 32 comprises ROM and FLASH, wherein ROM is used to store the BOOT program, and FLASH is used to store the internal software data of the chip. The hardware algorithm unit 331 is used for the hardware implementation of the security authentication algorithms, e.g., the encryption and decryption modules of AEA, AES, DES and others. The I/O interface 34 is used for the communication between the auxiliary chip 3 and the security chip 2. The auxiliary chip 3 may be constructed using a security chip or a general-purpose chip. In this embodiment, a general-purpose chip is specifically used for the construction, so as to reduce costs.

In this embodiment, the hardware algorithm units in the security chip 2 and the auxiliary chip 3 both include symmetric hardware algorithm units.

In the working process, the non-volatile storage unit 32 of the auxiliary chip 3 is at least used to store the security key, and the security chip is used to store software data and code table data, and constructs, between the security chip 2 and the upper computer 10, the communication link 12 which is used for communication, so as to use the I/O interface for performing the communication, and constructs, between the security chip 2 and the auxiliary chip 3, the communication link 13 for performing the communication, so as to use the I/O interface for communication. That is, in this embodiment, the auxiliary chip 3 is only coupled with the security chip 2 for performing the communication, and the working state of the auxiliary chip 3 is controlled by the security chip 2, that is, a master-slave working relationship is formed between the two, to form a dual-chip working mode.

In the following description, the working process of the security authentication system of the present application will be explained by taking as an example the security identity authentication process which is an information processing process.

Figure 4:
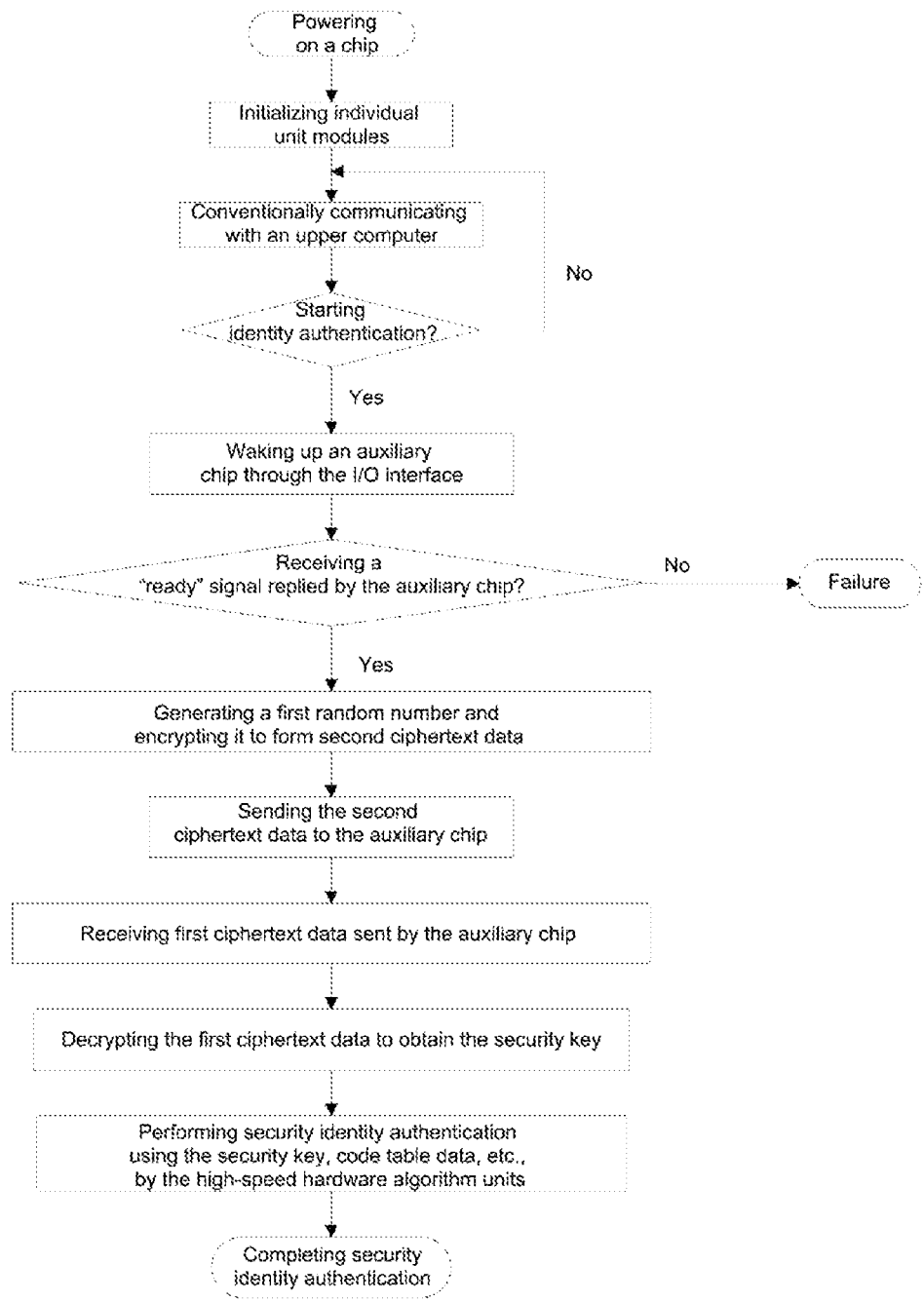
FIG. 4 is a working flow chart of the security chip in the security authentication process in Embodiment 1 of the present application.

FIG. 4 shows the working flow chart of the security chip 2 in the security identity authentication process, that is, the working flow chart of the information processing method of the security chip 2, which specifically comprises the first receiving step S11, the requesting step S12, the second receiving step S13, and the processing step S14, which are specifically as follows.

In the first receiving step S11, the security identity authentication request sent by the upper computer 10 is received through the I/O interface 24.

After the security chip 2 is powered on, each of unit modules are initialized, to enter a normal working state, and it communicates with the upper computer 10 through the I/O interface 24. At the same time, the auxiliary chip 3 is also powered on to initialize individual units thereof. After the auxiliary chip 3 is powered on, it will enter the dormant mode and stay in the standby state until the security chip sends a wake-up instruction to it. That is, in a normal state, the security chip 2 is in a working state and can communicate with the upper computer 10 independently, and the auxiliary chip 3 is in a standby state of a dormant mode to save power consumption.

When security identity authentication is required, the upper computer 10 will send a security identity authentication request to the security chip 2 through the I/O interface 24, specifically in the form of instructions.

In the requesting step S12, the security chip 2 sends a key acquisition request to the auxiliary chip 3 based on the received security authentication request sent by the upper computer 10.

When the security chip 2 receives the security identity authentication request sent by the upper computer 10, it first needs to wake up the auxiliary chip 3 in the dormant state, initiates a session request to the auxiliary chip 3, and constructs an encrypted communication mode between the two, so as to obtain, in an encrypted communication manner, from the auxiliary chip 3, the security key in the key data required for security identity authentication.

Specifically, the wake-up instruction is sent to the auxiliary chip 3, with the wake-up instruction used to wake up the auxiliary chip in the dormant state. After the auxiliary chip 3 receives the wake-up instruction and completes initialization, it will enter the working state from the dormant state and send a "ready" signal to the security chip 2, and officially start the encrypted communication, and specifically, the symmetric keys pre-stored in the non-volatile storage units of the two chips are used to construct an encryption channel for transmitting the encrypted data between the two.

After the security chip 2 receives the response information sent by the auxiliary chip 3 for the wake-up instruction, e.g. in this embodiment, after receiving the aforementioned ready signal, it generates a first random number and uses the preappointed symmetric key pre-stored in the security chip 2 to encrypt the first random number, to obtain the second ciphertext data, and the second ciphertext data is sent to the auxiliary chip 3.

The auxiliary chip 3 decrypts the second ciphertext data by using a preappointed symmetric key pre-stored in it, to obtain the first random number, so that the first random number temporarily stored in the two can be used to construct, between the two chips, an encryption channel with the first random number as a temporary symmetric key, that is, the encryption is performed using the temporarily generated first random number as the plaintext.

In this embodiment, the first random number is a group of random numbers, which are stored in the volatile storage unit 21 after being generated. In this step, AES is used as the symmetric encryption algorithm, and its key is agreed upon in advance by both parties.

In the second receiving step S13, the first ciphertext data, which is sent by the auxiliary chip 3 in response to the key acquisition request, is received, and the first ciphertext data is generated by encrypting the security key.

The auxiliary chip 3, through decrypting the obtained first random number as the symmetric key, encrypts the security key stored in its non-volatile storage unit 32, to form the first ciphertext data, that is, taking the security key data as the plaintext and the decrypted original random number as an encryption key, and the first ciphertext data is sent to the security chip 2. That is, in this embodiment, the first ciphertext data is formed by encrypting a security key stored in the non-volatile storage unit 32 of the auxiliary chip 3. In this embodiment, FLASH is used as the non-volatile storage unit 32. In this step, AES is used as the symmetric encryption algorithm, and the key is agreed upon in advance by both parties.

In the processing step S14, the decryption processing is performed on the received first ciphertext data, and the security identity authentication is performed based on the security key obtained by decryption and the code table data stored therein. That is, the processing step S14 comprises a decryption step S141 and a security identity authentication step S142. Herein, the decryption step S141 comprises that the security chip 2, after receiving the first ciphertext data sent by the auxiliary chip 3, uses the first random number generated in advance and stored in its volatile storage unit 21 as the symmetric key, to perform the decryption process, and the security key data originally stored in the non-volatile storage unit 32 of the auxiliary chip 3 is obtained by means of encryption. In this step, the symmetric encryption algorithm AES is used for performing the decryption, and the security key data obtained by the decryption is stored in the volatile storage unit 22. That is, in this embodiment, the step of decrypting the first ciphertext data comprises using the first random number generated in the requesting step to decrypt the first ciphertext data to obtain it.

The security identity authentication step S142 comprises performing the security authentication processing based on the security key obtained in the decryption step S141 and the code table data stored in the non-volatile storage unit 22 of the security chip. Specifically, the security chip 2 uses the security key data and the code table data, to perform the calculation through the high-speed hardware algorithm module, and completes the identity verification with the upper computer 10 in the subsequent steps. The specific process of the security identity verification can be obtained by referring to the prior art. It is not an improvement point of this application and will not be repeated here.

The auxiliary chip 3, after sending the first ciphertext data, enters a dormant state to reduce power consumption.

Figure 5:
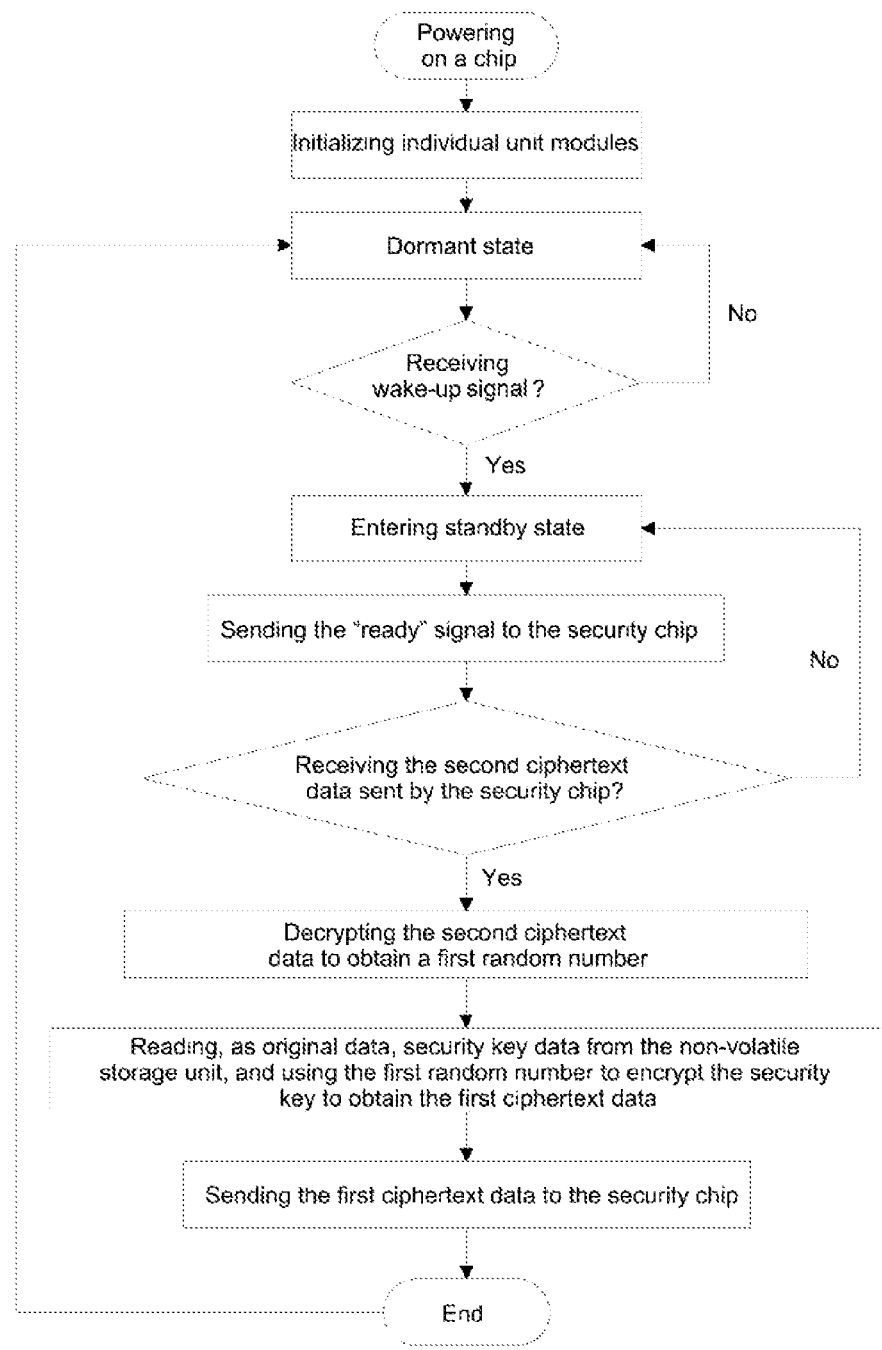
FIG. 5 is a working flow chart of the auxiliary chip in the security authentication process in Embodiment 1 of the present application.

FIG. 5 shows the working flow chart of the auxiliary chip 3 in the security identity authentication process, that is, the working flow chart of the information processing method of the auxiliary chip 3, that is, the auxiliary chip 3, in response to the received key acquisition request sent by the security chip 2, sends to the security chip the first ciphertext data which is formed by encrypting the security key. In this embodiment, the auxiliary chip 3 enters the dormant mode after completing the sending of the first ciphertext data, and is in a standby state to save power consumption. The information processing method of the auxiliary chip 3 specifically comprises a wake-up step S21, an encryption and decryption processing step S22, and a dormant step S23, which are specifically as follows.

In the wake-up step S21, after receiving the wake-up instruction sent by the security chip 2, the auxiliary chip 3 in the standby state enters the working state and sends response information to the security chip 2. The auxiliary chip 3 initializes its individual units after power-on, and enters the dormant mode after the power-on is completed, and is in a standby state to save power consumption, until the security chip sends a wake-up instruction to it. After receiving the wake-up instruction sent by the security chip 2, it indicates that the entire security authentication device will perform the security identity authentication, the auxiliary chip enters the normal working state from the standby state, and sends a "ready" signal to the security chip. Herein, the "ready" signal can be signal in plural forms, such as, a high-level or low-level, etc., which are agreed between the two, or a preappointed byte data, such as OXAO, that is, the auxiliary chip 3, in response to the received wake-up instruction, sends one specified byte data, "OXAO", to the security chip 2, to indicate that it is ready for operation, which constitutes the response information in this embodiment.

In the encryption and decryption processing step S22, the security key stored therein is encrypted to form the first ciphertext data, and then the first ciphertext data is sent to the security chip 2.

After receiving the second ciphertext data sent by the security chip 2, the second ciphertext data will be decrypted using the pre-stored symmetric key, to obtain the first random number which is temporarily generated by the security chip 2 during the current round of security identity authentication process. Taking the first random number as a symmetric key, the security key data originally stored in the non-volatile storage unit 32 of the auxiliary chip 3 is encrypted, that is, the security key data is used as plaintext, and the original random number obtained by decryption is used as an encryption key, and the first ciphertext data is sent to the security chip 2. In this embodiment, FLASH is used as the non-volatile storage unit 32. In this step, AES is used as the symmetric encryption algorithm. The symmetric key thereof is the first random number which is temporarily generated and transmitted through the encryption channel. That is, in this embodiment, the auxiliary chip first encrypts the security key stored in it to form the first ciphertext data, and then sends the first ciphertext data to the security chip.

In the dormant step S23, after sending the first ciphertext data, it enters a dormant mode and is in a standby state.

Herein, the opportune moment of the auxiliary chip 3 entering the dormant mode can be the moment when it enters the dormant state immediately and automatically after sending the first ciphertext data and receiving the response information of the security chip 2 of receiving the first ciphertext; and alternatively, the auxiliary chip 3, after receiving the security authentication completion confirmation message or the dormant instruction sent by the security chip 2, enters the dormant state. Herein, the dormant instruction can be sent at any time within the time period from receiving the first ciphertext data to completing the security identity authentication, or can be sent at the time after the security identity authentication is completed.

In this embodiment, the encryption decryption algorithm can use, but is not limited to, AES, DES, 3DES, ECC, RSA, etc.

The functional unit structures of the security chip of the embodiment of the present application comprise at least a requesting unit, a receiving unit, and a processing unit according to the sequence of steps in the information processing process. They can be implemented by hardware or software.

The requesting unit is used to send a key acquisition request to the auxiliary chip 3 after receiving the information processing request sent by the upper computer 10. Specifically, the requesting unit is used to send a wake-up instruction to the auxiliary chip 3, wherein the wake-up instruction is used to wake up the auxiliary chip 3 in the dormant state; and to generate the first random number, after receiving the response information sent by the auxiliary chip for the wake-up instruction, encrypt the first random number using a pre-stored symmetric key, and send it to the auxiliary chip 3.

The receiving unit is configured to receive the first ciphertext data which is sent by the auxiliary chip in response to the key acquisition request, wherein the first ciphertext data is generated by encrypting the security key. The first ciphertext data is the ciphertext data which is obtained by the auxiliary chip performing the encryption using the first random number as the symmetric key.

The processing unit is configured to perform decryption processing on the first ciphertext data, and perform the information processing based on the security key obtained by decryption. In this embodiment, specifically, the information processing involves the security identity authentication with the upper computer 10, wherein specifically, the first random number generated by the requesting unit is used as the security key at the decryption of the symmetric key and the code table data original stored in the non-volatile storage unit 22, to perform the security identity authentication using a high-speed hardware algorithm unit.

The specific information processing process of the requesting unit, the receiving unit and the processing unit may be obtained by referring to the corresponding steps of the information processing method of the security chip 2 described above, which will not be repeated here.

The specific process of the embodiment of the security authentication method of the present application is completed by the upper computer 10, the security chip 2 and the auxiliary chip 3 in combination. The working flows of the two chips shown in FIG. 4 and FIG. 5 specifically comprise the following steps.

In step S31, the security chip 2 sends a key acquisition request to the auxiliary chip 3 in response to the security authentication request sent by the upper computer 10.

The step of sending the key acquisition request to the auxiliary chip 3 specifically includes:

(1) the security chip 2 sending a wake-up request to the auxiliary chip 3 to wake up the auxiliary chip 3 in the dormant state; and the auxiliary chip sending, in response to the wake-up request, the response information to the security chip, wherein in this embodiment, the "response information" is specifically a "ready" signal; and (2) the security chip 2 generating a first random number after receiving the response information sent by the auxiliary chip 3; encrypting the first random number using a pre-stored symmetric key to form the second ciphertext data; and sending it to the auxiliary chip 3, so that an encryption channel using the first random number as the temporary symmetric key is constructed between the two.

In step S32, the auxiliary chip 3 sends to the security chip 2 the first ciphertext data which is formed by encrypting the security key, in response to the received key acquisition request.

In this embodiment, the auxiliary chip 3 first encrypts the security key stored in its non-volatile storage unit 32 to form the first ciphertext data, and then sends the first ciphertext data to the security chip 2. Specifically, it comprises the following steps:

(1) the auxiliary chip 3 using the pre-stored symmetric key to decrypt the received second ciphertext data to obtain the first random number, and then using the first random number as the symmetric key to encrypt the security key to form the first ciphertext data; and (2) sending to the security chip 2 the first ciphertext data which is formed by encryption.

In step S33, the security chip 2 decrypts the received first ciphertext data to obtain a security key, and performs, in combination the code table data stored thereon, the security authentication with the upper computer 10.

The specific process of the information processing method of the security chip 2 and the auxiliary chip 3 in the embodiment of the security authentication method of the present application has been described in detail in the above-mentioned information processing processes of the two, which will not be repeated here.

From the above description of details, it can be seen that the security chip 2 and the auxiliary chip 3 in the security authentication device 11 of the present application constitute a master-slave working relationship in which the auxiliary chip 3 is controlled by the security chip 2.

In order to improve information security, in this embodiment, the security key and the code table data in the key data required for the security authentication are stored separately, wherein the code table data is stored in the non-volatile storage unit 22 of the security chip 2, and the security key is stored in the non-volatile storage unit 32 of the auxiliary chip 3; and when a security identity authentication behavior with the upper computer 10 occurs, the security chip 2 obtains the security key information from the auxiliary chip 3 by means of encryption, and calculates the session key, completing the identity authentication.

That is, in this embodiment, the auxiliary chip 3 comprises an MCU core unit 30 and a ciphertext supply unit for providing the first ciphertext data which is formed by encrypting the security key, wherein the ciphertext supply unit comprises the non-volatile storage unit 32 for storing the security key and a hardware algorithm unit for encrypting the security key to form the first ciphertext data.

The security chip 2 comprises an MCU core unit 20, a non-volatile storage unit 22 for storing code table data, a hardware algorithm unit for decrypting the first ciphertext data sent by the auxiliary chip 3, and a volatile storage unit 21 that stores temporarily the security key that is obtained by decryption. Specifically, the security chip 2 also comprises a random number generation unit for generating a first random number, so as to use the first random number generated by it to construct between the two chips a temporary encryption channel for the symmetric encryption.

Embodiment 2

In the description of this embodiment, only the difference between the information processing processes of the two chips is exemplarily described, that is, only the difference from the above-mentioned Embodiment 1 is explained, and the reference numbers of individual units are the same as those in Embodiment 1.

The non-volatile storage unit 32 of the auxiliary chip 3 stores the security key information that has already been encrypted, that is, stores the first ciphertext data in Embodiment 1, and the first decryption key used to decrypt the first ciphertext data is stored in the non-volatile storage unit 22 of the security chip 2 in advance.

That is, in this embodiment, the first ciphertext data is generated by encrypting the security key data required for the security authentication, and the key required for the decryption is the aforementioned first decryption key, and the security chip 2 is not required to generate the first random number and perform calculations of the symmetric encryption and decryption. For the encryption and decryption of the first ciphertext data, either a symmetric encryption algorithm can be used for the encryption and decryption, or an asymmetric encryption and decryption algorithm can be used for the encryption and decryption.

In addition, in order to further reduce the communication steps, the pre-stored first ciphertext data can be directly sent to the security chip 2, as the response information for the wake-up instruction.

Embodiment 3

In the description of this embodiment, only the difference between the information processing processes of the two chips is exemplarily described, that is, only the difference from the above-mentioned Embodiment 1 is explained, and the reference numbers of individual units are the same as those in Embodiment 1.

After the auxiliary chip 3 receives the wake-up instruction, it generates a pair of public key and private key based on the asymmetric encryption and decryption algorithm, the private key is stored in the volatile storage unit 31, and the public key is sent to the security chip 2. Specifically, the public key can be used as the response information for the wake-up instruction, and the security chip 2 uses the public key to encrypt the first random number using an asymmetric encryption and decryption algorithm to obtain the second ciphertext data and send it to the auxiliary chip 3. The auxiliary chip uses the private key stored in the volatile storage unit 31 to perform the decryption, and then uses the first random number obtained by the decryption as a symmetric key to encrypt the security key to obtain the first ciphertext data.

Embodiment 4

In the description of this embodiment, only the difference between the information processing processes of the two chips is exemplarily described, that is, only the difference from the above-mentioned Embodiment 1 is explained, and the reference numbers of individual units are the same as those in Embodiment 1.

The security chip 2 directly generates a pair of public key and private key after receiving the response information which is sent from the auxiliary chip 3 for the wake-up instruction, and sends the public key to the auxiliary chip 3 to encrypt the security key, to generate the first ciphertext data, that is, the process of generating the second ciphertext data is not required.

In the present application, on the basis of the existing security chip, through adding an auxiliary chip usually constructed by a general-purpose chip with the auxiliary chip controlled by the security chip and forming a master-slave working relationship with the security chip, the security key and the code table data of the identity authentication are stored separately, wherein the security key is stored in the auxiliary chip, and the code table data is stored in the security chip. The security chip can separately complete the conventional communication with the upper computer for exchanging the data. When a security identity authentication behavior with the upper computer occurs, the security chip obtains the security key information from the auxiliary chip by means of encryption, calculates the session key, and completes the identity authentication. With this dual-chip design, even if the security chip or the auxiliary chip is cracked separately, the attacker cannot get all the key data, which increases the difficulty of cracking the chips and enhances the cost of cracking.

In addition, the use of the dual-chip protection structure of the master-slave working relationship is not limited to the security authentication process in the above-mentioned embodiment, and specifically can also be used in other information processing processes besides the security authentication, that is, the security key can be stored in the auxiliary chip, and other authentication information incorporated with the security key or the information encrypted and decrypted by the security key is stored in the security chip, so that it is difficult for the chip cracker to obtain all the data required for the information processing through cracking one of the chips, which has effectively improved the information security.

Embodiment 5

For consumable products, such as data cables, batteries, medical consumables, etc., when they are used in conjunction with terminal equipment, such as mobile phones, vehicles, medical equipment and others, they will be certified by the manufacturer to ensure that the original products are used to avoid the problems, such as, mismatches etc., which is produced by using the non-original consumables. In the process of authenticating the original consumables, the terminal upper computer will read the key pair required for verification from the consumables loaded in it, so as to perform the security authentication. The key pair is usually generated when the consumables leave the factory. During the process that consumables are in sale and in use, it is necessary to prevent the key pair from being cracked and obtained by a third party, so as to avoid being used on the non-original consumables.

Referring to FIGS. 6 and 7, the authentication method of the present application is used for the security authentication of such as the identity, between the to-be-authenticated device 11 and the terminal upper computer 10. The to-be-authenticated device 11 and the terminal upper computer 10, in combination, constitute the security authentication system in this embodiment. The authentication method specifically comprises an authentication requesting step S11, a decryption step S12, and an authentication step S13.

As shown in FIGS. 7 and 8, the to-be-authenticated device 11 comprises a security chip 2, wherein the security chip 2 comprises a main control unit 20, a volatile storage unit 21, a programmable storage unit 22, a configurable device 23, an I/O interface 24, a communication unit 25, a key pair generation unit 3, a private key encryption and decryption unit 4, and multiple algorithm units. Herein, the main control unit 20 is mainly used for the internal control and calculation of the chip to coordinate and plan the tasks, such as the generation of key pairs, the encryption of the private key and so on. It can use, but is not limited to, the MCU core unit. The volatile storage unit 21 is mainly used for storing the temporary data, such as the data generated during running of the chip program. It can be but is not limited to, SRAM. The programmable memory 22 is used to store key data required for program authentication, etc., and can use, but is not limited to, Flash, MTP, EEPROM, etc. The key pair generation unit 3 is used to generate a key pair used for the verification. The configurable device 23 can be, but is not limited to, the basic circuit unit, Fues, Rom, etc. There may be multiple configurable devices 23, and the used configurable device has the inherent device parameter values which will vary according to the chip and cannot be changed after being determined. The I/O interface 24 and the communication unit 25 are used to communicate with the terminal upper computer 10 or with the encryption upper computer to exchange data, such as, transmitting the public key in the key pair generated by the private key pair generation unit 3 to the upper computer during encryption for being encrypted, and receiving the ciphertext public key output by the encryption upper computer. The ciphertext public key is the ciphertext data which is generated by the encryption upper computer performing the encryption calculation on the private key based on the encryption algorithm stored therein, and sending to the terminal upper computer 10 the ciphertext public key required for verification and the data to be verified. The private key encryption decryption unit 4 is used to encrypt the private key in the key pair generated by the key pair generation unit 3 to generate a ciphertext private key, and is used to decrypt the ciphertext private key to obtain the aforementioned private key. The multiple algorithm units specifically include an algorithm unit 261, an algorithm unit 262, etc., which are used for complex calculations such as encryption, decryption, and signature, etc. In this embodiment, the encryption upper computer is the public key encryption device used in the manufacturing of the device to be authenticated, and the terminal upper computer 10 stores the encryption and decryption algorithm used for encrypting the public key on the encryption upper computer, which can be used as the encryption upper computer, or may be another device different from the encryption upper computer. And, the number of terminal upper computers 10 may be multiple.

Figure 9:
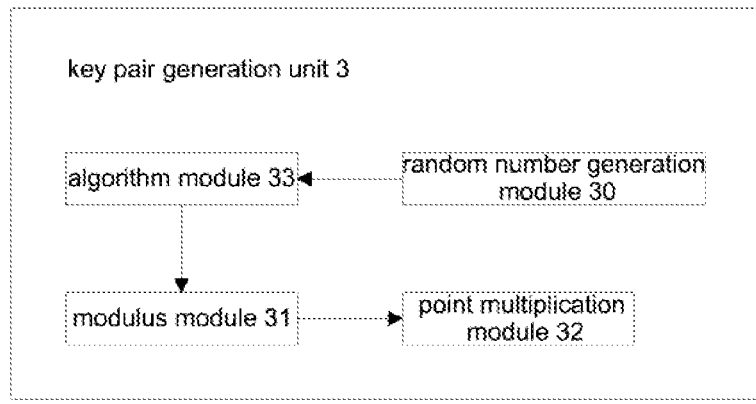
FIG. 9 is a structural block diagram of the circuit principle of the generation unit for the key pair in Embodiment 5 of the present application.

As shown in FIG. 9, the key pair generation unit 3 comprises a random number generation module 30 (Random), a point multiplication module 31 (Point Mult), a modulus module 32 (Mod), and an algorithm module 33. Herein, the random number generation module 30 is used to generate a true random number, the modulus module 31 is used to perform the modulus operation on the data, the point multiplication module 32 is used to perform a point multiplication operation on the data, and the algorithm module 33 is responsible for calculating the encrypted data.

Figure 10:
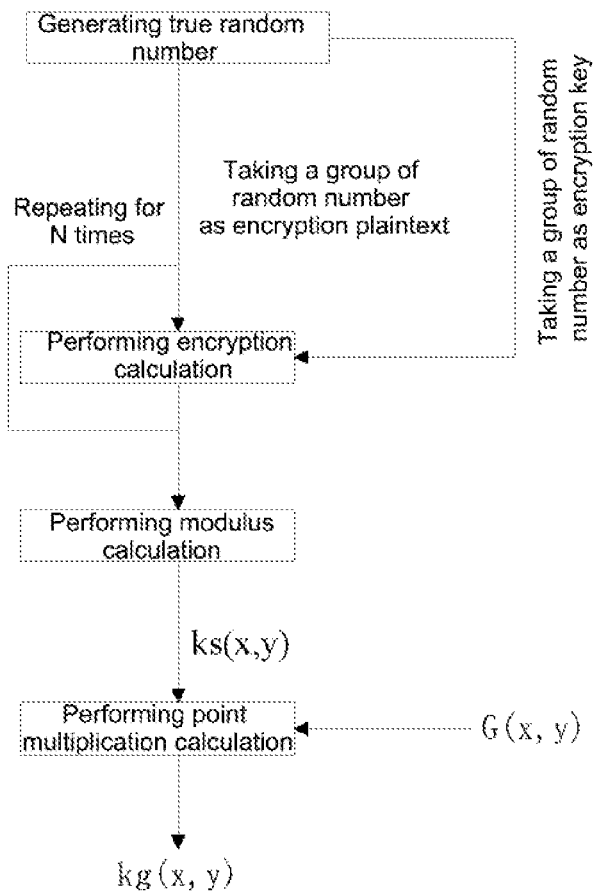
FIG. 10 is a working flow chart of a method of generating a key pair in Embodiment 5 of the present application.

As shown in FIG. 10, the process of the key pair generation unit 3 generating a key pair specifically comprises the following steps.

Generation step S21, in which the random number generation module 30 generates two sets of true random numbers.

Encryption step S22, in which one set of the two sets of true random numbers generated in Generation step S21 is used as the key of the algorithm module, and the other set as the plaintext data, and the algorithm module 33 is used for the encryption calculation; and the ciphertext data which is obtained by encryption calculation of the algorithm module 33 is used as plaintext data, and one set of true random numbers generated by the random number generation module 30 is used as the encryption key, and it is executed more than twice in a loop.

Modulus step S23, in which the modulus module 32 performs a modulus operation on the data which is obtained in the final round of the encryption step S22 to obtain the private key ks in the key pair.

Point multiplication step S24, in which the point multiplication module 32 is used, the point G of the elliptic curve is introduced in to obtain the public key kg, wherein the elliptic curve parameters are T(p, a, b, G, n, h), where p, a, b are used to determine an elliptic curve, G is the base point, n is the order of point G, and h is the integer part of the result which is obtained by the number m of all points on the elliptic curve being divided by n. The elliptic curve includes, but is not limited to, 256$k$1, 256$r$1, etc.

In this embodiment, the algorithm of the algorithm module 33 can be selected from, but is not limited to, AES, DES, 3DES, and RSA algorithms. The method for generating the key pair can be a method in the prior art for generation, and is not limited to the method in this embodiment.

Figure 11:
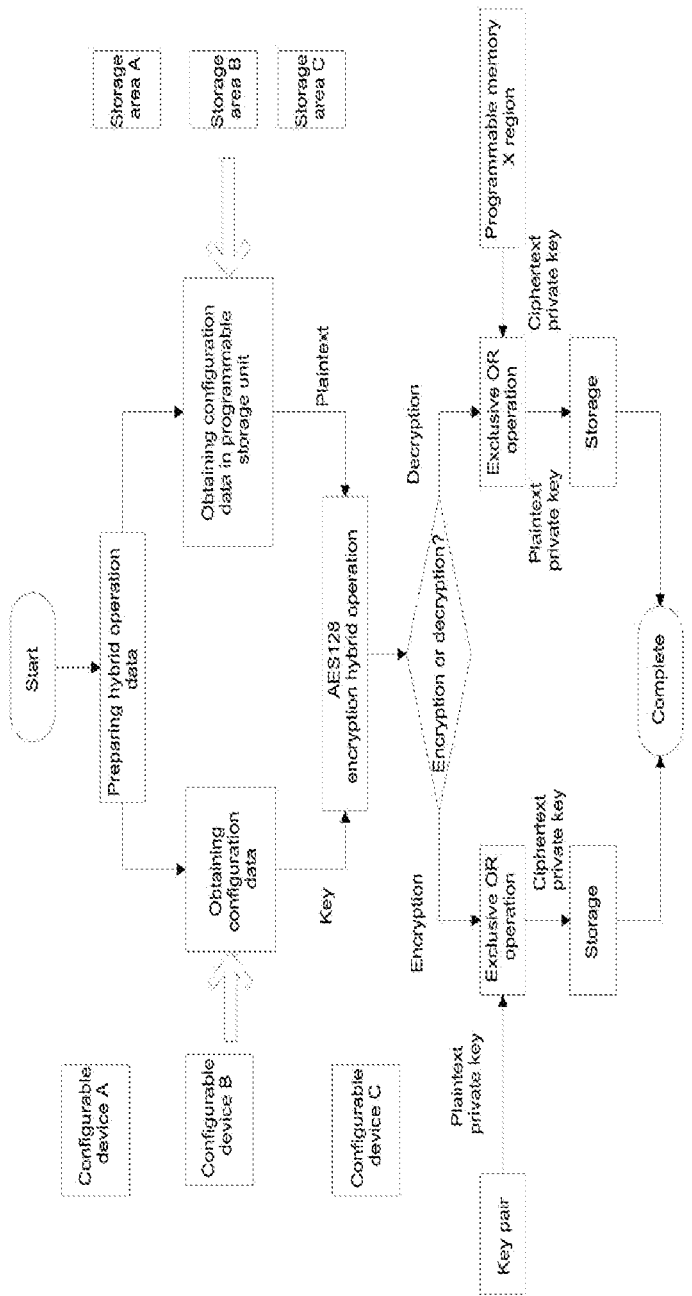
FIG. 11 is a working flow chart of the encryption and decryption method of the ciphertext private key in Embodiment 5 of the present application.

In the present application, the key pair generated in the security chip 2 for subsequent security authentication is not directly stored in the programmable memory 22, but the private key ks and the public key kg in the key pair are encrypted separately to form the ciphertext private key and the ciphertext public key, which are then stored in the programmable memory 22. The encryption method of the key pair comprises a public key encryption step S31 and a private key encryption step S32, which is an embodiment of the key pair processing method of the present application. As shown in FIG. 11, the specific processing process is as follows.

In the public key encryption step S31, an encryption algorithm is used to encrypt the public key kg in the key pair to generate a ciphertext public key.

After the public key kg and private key ks are generated in the security chip 2, the public key kg is output to the encryption upper computer through the I/O interface 24 or the communication unit 25, and the encryption upper computer uses the encryption algorithm stored in it to encrypt the public key kg to form a ciphertext public key, output it to the security chip 2 to be stored in the programmable memory 22.

Herein, the number of encryption upper computers can be one, and the number of terminal upper computers can be multiple. After the encryption upper computer uses software to encrypt the public key kg, the encryption algorithm and the encryption key are copied to the terminal upper computer 10, and consistently stored during subsequent use.

In private key encryption step S32, the inherent device parameters of the configurable device on the current processing device and the configuration data stored in the current processing device are obtained; and it uses an encryption algorithm to encrypt the configuration data, inherent device parameters and the private key in the key pair to generate ciphertext private key, wherein in this embodiment, the current processing device is the to-be-authenticated device 11, and specifically, it comprises the acquisition step S321 and the encrypting step S322. The encryption of the private key is completed before leaving the factory.

In the acquisition step S321, the configuration data is read from the designated storage area in the programmable memory 22, and the inherent device parameters of the designated configurable device 23 are read.

Herein, the configurable device 23 can be, but is not limited to, the basic circuit unit, Fues, Rom, etc. The inherent device parameter value of the used configurable device will vary according to the chip and cannot be changed after being determined, for example, the inherent device parameter may be the resistance of one pull-up resistor or the product model of a certain device or the like, and alternatively, multiple devices may be used as the configurable devices, so that their inherent device parameters can be used as the data used for encryption and decryption. The configuration data may be data stored in a designated storage area, specific data, or data stored in multiple storage areas.

In the encryption step S322, an encryption algorithm is used to encrypt the configuration data, the inherent device parameters, and the private key ks in the key pair to generate a ciphertext private key.

(1) The configuration data and the inherent device parameters read in step S321 are obtained by using a symmetric algorithm hybrid operation to generate the first ciphertext data, wherein in this embodiment, the inherent device parameter of the configurable device is used as the encryption key, and the configuration data is used as the plaintext, for performing the encryption calculation.

(2) An exclusive OR operation is performed on the first ciphertext data generated by encryption and the private key ks in the key pair, to generate the ciphertext private key.

(3) The obtained key ciphertext data composed of the ciphertext public key and the ciphertext private key is written into the programmable storage unit 22, wherein in this embodiment, in the device to be authenticated, the key pair required for authentication is stored in the programmable storage unit 22 in the form of a ciphertext private key and a ciphertext public key, rather than that the key pair directly generated by the key pair generation unit 3 is directly stored in the programmable storage unit 22.

The key pair processing device embodiment corresponding to the key pair processing method comprises a processor and a memory in this embodiment, and computer programs are stored in the memory. When the computer program is executed by the processor, the steps of the above processing method can be realized.

When it is necessary to perform security authentication between the terminal upper computer 10 and the to-be-authenticated device 11, the security authentication comprises but is not limited to identity authentication, encryption and decryption of signature and data, etc. The authentication method comprises the authentication requesting step S41, the decryption step S42, and the authentication Step S43, and the specific process is as follows.

In the authentication requesting step S41, the terminal upper computer 10 sends an authentication request to the to-be-authenticated device 11.

In the decryption step S42, the to-be-authenticated device 11, in response to the authentication request sent by the terminal upper computer 10, decrypts and generates the current private key based on the ciphertext private key, the current configuration data and the inherent device parameters of the current configurable device(s); and sends the data to be verified and the ciphertext public key to the terminal upper computer 10, wherein the data to be verified is generated by calculating the target data using the current private key as the password, wherein specifically, it comprises a reading step S421, a decrypting step S422, a calculation step S23, and a sending step S424.

In the reading step S421, the current configuration data and the ciphertext private key are read from the programmable memory 22 of the current to-be-authenticated device 11, and the inherent device parameters of the specified configurable device are read.

In the decryption step S422, the current configuration data and the inherent device parameters of the current configurable device read by the symmetric algorithm hybrid operation are used to generate second ciphertext data; and the second ciphertext data and the ciphertext private key are subject to the exclusive OR operation to generate the current private key.

In the calculation step S23, it uses the current private key generated by decryption as the password to calculate the target data, and generates the data to be verified carrying the private key information, wherein the calculation method can be, but not limited to, in such a way that the current private key is used as a password to perform the encryption calculation on the aforementioned target data, or the current private key is used as a password to sign the aforementioned target data, wherein the target data can be any piece of text data or digital data; and the target data is preferably the random data, which may be a group of data generated by a random number generation module, or a group of data randomly read from a storage unit.

In a sending step S424, the ciphertext public key stored in the programmable memory 22 together with the data to be verified which is generated in the calculation step S423 is sent to the terminal upper computer 10 through the I/O interface 24 or the communication unit 25, wherein in this sending step, the ciphertext public key and the data to be verified can be sent synchronously or asynchronously.

In authentication step S43, the terminal upper computer 10 decrypts the ciphertext public key to generate a public key, and performs identity authentication based on whether the public key generated by decryption matches the aforementioned data to be verified.

The configuration data in the programmable storage unit 22 can be placed at multiple storage areas at the same time.

In the above encryption step S322 and decryption step S422, the "exclusive OR operation" is performed on the two data, which is one of the hybrid operations based on the symmetric algorithm. In the present application, the encryption and decryption calculations of the two steps preferably use, but is not limited to, the exclusive OR operation.

In the above authentication method, the process of decrypting the ciphertext private key to generate the private key constitutes the key pair processing method in this embodiment. And in this processing method, in order to distinguish the processing device used for key encryption from the processing device used for current decryption, the processing device used for encryption is defined as the processing device which is used for encryption, and the processing device used for decryption is the current processing device. In this embodiment, it is the current device to be authenticated, the stored configuration data thereof is set as the current configuration data, and the inherent device parameters are the inherent device parameters of the current configurable device.

As a preferred technical solution in this embodiment, as shown in FIG. 12, one auxiliary chip 6 controlled by the security chip 2 is added to the to-be-authenticated device 11. As shown in FIG. 13, the auxiliary chip 6 comprises an MCU core unit 60, a volatile storage unit 61, a non-volatile storage unit 62, an I/O interface 64, and more than one hardware algorithm unit 631. The MCU core unit 60 is mainly used for internal control and operation of the chip, and is usually a general-purpose MCU core, such as MSP430 and CORTEX-M0, etc. The volatile storage unit 61 is mainly used for storing temporary data, such as the input data of the hardware algorithm module or the data which is generated when the chip program is running and specifically SRAM is used. The non-volatile storage unit 62 comprises ROM and FLASH, wherein ROM is used to store the BOOT program, and FLASH is used to store the internal software data of the chip. The hardware algorithm unit 631 is used for the hardware implementation of the security authentication algorithms, such as encryption and decryption modules of AEA, AES, DES and others. The I/O interface 64 is used for the communication between the auxiliary chip 6 and the security chip 2. The auxiliary chip 6 can be constructed using an encryption chip or a general-purpose chip. In this embodiment, a general-purpose chip is specifically used for the construction to reduce costs.

In this embodiment, the hardware algorithm units in the security chip 2 and the auxiliary chip 6 both include symmetric hardware algorithm units.

In the working process, the configuration data is stored in the non-volatile storage unit 62 of the auxiliary chip 6, and the security chip 2 is used for the ciphertext private key and the ciphertext public key, and constructs between the security chip 2 and the terminal upper computer 10 a communication link 12 for communication, so as to use the I/O interface for communication, and constructs a communication link 13 for communication between the security chip 2 and the auxiliary chip 6 to use the I/O interface for communication. That is, in this embodiment, the auxiliary chip 3 is only coupled to the security chip 2 for communication, and the working state of the auxiliary chip 6 is controlled by the security chip 2, that is, a master-slave working relationship is formed between the two to form a dual-chip working mode.

In the following description, the encryption and decryption processes of the ciphertext private key are as follows.

Referring to the steps shown in FIGS. 4 and 5, the working flow chart of the security chip 2 and the auxiliary chip 6 in the encryption and decryption processes of the ciphertext private key is as follows.

In step S61, the security chip 2 receives the authentication request sent by the terminal upper computer 10 through the I/O interface 24.

After the security chip 2 is powered on, it initializes individual unit modules and enters a normal working state, and communicates with the terminal upper computer 10 through the I/O interface 24. At the same time, the auxiliary chip 6 is also powered on to initialize its individual units, and the auxiliary chip 6, after being powered on, enters a dormant mode and is in a standby state until the security chip sends a wake-up instruction to it. That is, in a normal state, the security chip 2 is in a working state and can independently communicate with the terminal upper computer 10, and the auxiliary chip 6 is in a standby state in a dormant mode to save power consumption.

When the security identity authentication is required, the terminal upper computer 10 will send a security authentication request to the security chip 2 through the I/O interface 24, specifically in the form of instructions.

In step S62, the security chip 2 sends a key acquisition request to the auxiliary chip 6 based on the received authentication request sent by the terminal upper computer 10.

When the security chip 2 receives the security identity authentication request sent by the terminal upper computer 10, it first needs to wake up the auxiliary chip 6 in the dormant state, and initiate a session request to the auxiliary chip 6, and construct an encrypted communication mode between the two, so as to obtain from the auxiliary chip 6 the security key in the key data required for security identity authentication, in an encrypted communication manner.

Specifically, it is to send to the auxiliary chip 6 a wake-up instruction which is used to wake up the auxiliary chip in the dormant state. The auxiliary chip 6, after receiving the wake-up instruction and completing initialization, will enter the working state from the dormant state and send the "ready" signal to the security chip 2, and officially start the encrypted communication. Specifically, the symmetric keys stored in advance in the non-volatile storage units of the two chips are used to construct an encryption channel between the two, for transmitting the encrypted data.

The security chip 2, after receiving the response information sent by the auxiliary chip 6 for the wake-up instruction, which is the aforementioned ready signal in this embodiment, generates the first random number and uses the preappointed symmetric key pre-stored in the security chip 2 to encrypt the first random number, to obtain the fourth ciphertext data, and sends the fourth ciphertext data to the auxiliary chip 6. Herein, the "ready" signal can be the signal in multiple forms between the two, such as appointed high-level or low-level, or a preappointed byte data, such as OXAO, that is, the auxiliary chip 6 responds to the received wake-up instruction to send a specified byte data "OXAO" to the security chip 2 to indicate that it is ready for operation, which constitutes the response information in this embodiment.

The auxiliary chip 6 decrypts the fourth ciphertext data by using a preappointed symmetric key stored in it in advance to obtain the first random number, so that the first random number temporarily stored in the two can be used to construct between the two chips an encryption channel using the first random number as a temporary symmetric key, that is, encryption is performed using the temporarily generated first random number as the plaintext.

In this embodiment, the first random number is a group of random numbers, which are stored in the volatile storage unit 21 after being generated. In this step, AES is used as the symmetric encryption algorithm, and the key thereof is agreed upon in advance by both parties.

In step S63, the security chip receives the third ciphertext data which is sent by the auxiliary chip 6 in response to the key acquisition request. The third ciphertext data is generated by encrypting the configuration data stored in the specific storage area of the non-volatile storage unit 62 of the auxiliary chip.

The auxiliary chip 6 uses, as the symmetric key, the first random number obtained by decryption, to encrypt the configuration data stored in its non-volatile storage unit 62 to form the third ciphertext data, that is, the configuration data is used as plaintext and the original random number obtained by decryption is used as an encryption key, and the third ciphertext data is sent to the security chip 2. That is, in this embodiment, the third ciphertext data is formed by encrypting the configuration data stored in the non-volatile storage unit 62 of the auxiliary chip 6. In this embodiment, FLASH is used as the non-volatile storage unit 62. In this step, AES is used as the symmetric encryption algorithm, and the key is agreed upon in advance by both parties.

In Step S64, the decryption processing is performed on the received third ciphertext data, and the encryption and decryption calculations on the ciphertext private key is performed based on the configuration data obtained by decryption, so as to encrypt the private key to form a ciphertext private key or decrypt the ciphertext private key to form a private key.

In this embodiment, the encryption and decryption algorithm can be, but not limited to, AES, DES, 3DES, ECC, RSA, etc.

In this embodiment, on the basis of the existing security chip, the configuration data required for encryption and decryption is stored in the auxiliary chip 6, through adding one auxiliary chip which is usually constructed by a general-purpose chip and is controlled by the security chip so as to form a master-slave working relationship with the security chip. The security chip can independently complete the conventional communication with the upper computer for exchanging data. When a security authentication behavior with the upper computer occurs, the security chip obtains configuration data from the auxiliary chip by means of encryption. With this dual-chip design, even if the security chip or the auxiliary chip is cracked separately, the attacker cannot get all the key data, which enhances the difficulty of cracking the chip, and increases the cost of cracking.

In the present application, the basic idea is that the key pair is not directly stored inside the chip, the private key generated by the key generation module is encrypted through the inherent device parameters of the configurable device and the configuration data stored in the programmable memory, and the public key data is encrypted by the upper computer using the encryption algorithm, and finally the encrypted data is stored in the programmable storage unit of the chip. At the same time, physical chips and internal information data are bundled to increase the cost of brute force cracking by third-party companies.

The key pair processing device corresponding to the key pair processing method of the key pair decryption process comprises a storage unit and a decryption unit.

Here, the storage unit is constructed by the programmable memory 22 in this embodiment, and is used to store the key pair in the form of a ciphertext public key and a ciphertext private key. The ciphertext public key is generated by encrypting the public key in the key pair. The ciphertext private key is generated by encrypting the private key in the key pair, the configuration data stored in the processing device during encryption, and the inherent device parameters of the configurable device on the processing device. The encryption generation method of the ciphertext private key is the same as the key pair processing method during encryption, which will not be repeated here.

The decryption unit is constructed by the ciphertext private key decryption unit 4 in this embodiment, and is used to read the inherent device parameters of the configurable device in the processing device and the configuration data stored therein, and decrypt the ciphertext private key to generate a private key. The decryption algorithm has been described in detail in the description of the above processing method, and will not be repeated here.

In this embodiment, through providing a private key encryption and decryption module inside the chip, when the chip is initially produced, a hybrid operation is performed through the private key encryption module on the newly generated private key, the inherent device parameters of the configurable device, and the configuration data pre-set in the programmable memory, and finally, the obtained data is written into the programmable memory. When the chip is working normally, the chip uses the private key encryption and decryption module to perform the hybrid operation on the ciphertext data, configuration data and the inherent device parameters of the configurable device in the programmable memory, to obtain the private key, and the data to be encrypted or signed is encrypted or signed.

What is claimed is:

1. An information processing method for a security chip, comprising following steps:
    a requesting step, of sending a key acquisition request to an auxiliary chip based on an information processing request sent by an upper computer is received;
    a receiving step, of receiving a first ciphertext data which is sent by the auxiliary chip in response to the key acquisition request, wherein the first ciphertext data is generated by encrypting a security key; and
    a processing step, of performing decryption processing on the first ciphertext data, and performing information processing based on the security key obtained by decryption,
    wherein:
    the step of sending the key acquisition request to the auxiliary chip comprises sending a second ciphertext data to the auxiliary chip, wherein the second ciphertext data is generated by the security chip encrypting a first random number using a pre-stored symmetric key, and the first random number is a random number which is generated by the security chip after receiving the information processing request;
    the auxiliary chip uses a pre-stored symmetric key to decrypt the second ciphertext data to obtain the first random number, and then uses the first random number as a symmetric key to encrypt the security key to form the first ciphertext data; and
    the step of decrypting the first ciphertext data comprises using the first random number as a symmetric key to decrypt the first ciphertext data.

2. The information processing method according to claim 1, wherein the first ciphertext data is formed by encrypting the security key stored in the auxiliary chip.

3. The information processing method according to claim 2, wherein the information processing request is a security authentication request; and
    the step of performing information processing based on the security key obtained by decryption comprises performing security authentication processing based on the security key and code table data stored in the security chip.

4. The information processing method according to claim 2, wherein the auxiliary chip is a general-purpose chip.

5. The information processing method according to claim 1, wherein the auxiliary chip is a general-purpose chip.

6. The information processing method according to claim 5, wherein the information processing request is a security authentication request; and
    the step of performing information processing based on the security key obtained by decryption comprises performing security authentication processing based on the security key and code table data stored in the security chip.

7. The information processing method according to claim 1, wherein the information processing request is a security authentication request; and
    the step of performing information processing based on the security key obtained by decryption comprises performing security authentication processing based on the security key and code table data, wherein the code table data is stored in the security chip.

8. The information processing method according to claim 7, wherein:
    the step of sending the key acquisition request to the auxiliary chip comprises: the security chip sending a wake-up instruction to the auxiliary chip for waking up the auxiliary chip in a dormant state; and the auxiliary chip sending response information to the security chip in response to the wake-up instruction.

9. The information processing method according to claim 8, wherein:
    the security chip, after receiving the response information, generates a first random number, encrypts the first random number using a pre-stored symmetric key to form the second ciphertext data, and sends the second ciphertext data to the auxiliary chip;

the auxiliary chip uses a pre-stored symmetric key to decrypt the second ciphertext data to obtain the first random number, and then uses the first random number as a symmetric key to encrypt the security key to form the first ciphertext data; and the step of decrypting the first ciphertext data comprises using the first random number as a symmetric key to decrypt the first ciphertext data.

10. The information processing method according to claim 7, wherein:

the auxiliary chip automatically enters a dormant state after sending the first ciphertext data; or, the auxiliary chip enters the dormant state after receiving a security authentication completion confirmation message or a dormant instruction sent by the security chip.

11. The information processing method according to claim 1, wherein the information processing request is a security authentication request; and the step of performing information processing based on the security key obtained by decryption comprises performing security authentication processing based on the security key and code table data stored in the security chip.

12. A security chip, comprising: a processor and a memory, wherein the memory stores computer programs, when the computer programs are executed by the processor, cause the security chip to perform the following steps:

a requesting step, of sending a key acquisition request to an auxiliary chip based on an information processing request sent by an upper computer is received;

a receiving step, of receiving a first ciphertext data which is sent by the auxiliary chip in response to the key acquisition request, wherein the first ciphertext data is generated by encrypting a security key; and a processing step, of performing decryption processing on the first ciphertext data, and performing information processing based on the security key obtained by decryption, wherein:

the step of sending the key acquisition request to the auxiliary chip comprises sending a second ciphertext data to the auxiliary chip, wherein the second ciphertext data is generated by the security chip encrypting a first random number using a pre-stored symmetric key, and the first random number is a random number which is generated by the security chip after receiving the information processing request;

the auxiliary chip uses a pre-stored symmetric key to decrypt the second ciphertext data to obtain the first random number, and then uses the first random number as a symmetric key to encrypt the security key to form the first ciphertext data; and the step of decrypting the first ciphertext data comprises using the first random number as a symmetric key to decrypt the first ciphertext data.

13. The security chip according to claim 12, wherein the security authentication method comprises steps of:

generating a first random number, and symmetrically encrypting the first random number to form the second ciphertext data;

sending the second ciphertext data to the auxiliary chip;

generating the first ciphertext data is generated in a way that the auxiliary chip decrypts the second ciphertext data based on a symmetric key pre-stored therein to obtain a first random number and encrypts a security key stored therein based on the first random number; and using the first random number as a symmetric key to decrypt the first ciphertext data.

14. The security chip according to claim 13, wherein the auxiliary chip is a general-purpose chip.

15. The security chip according to claim 13, wherein the information processing request is a security authentication request; and the security authentication method comprises a step of:

performing security authentication processing based on the security key and code table data stored in the security chip.

16. The security chip according to claim 12, wherein the auxiliary chip is a general-purpose chip.

17. The security chip according to claim 16, wherein the information processing request is a security authentication request; and the security authentication method comprises a step of:

performing security authentication processing based on the security key and code table data stored in the security chip.

18. The security chip according to claim 12, wherein the information processing request is a security authentication request; and the security authentication method comprises a step of:

performing security authentication processing based on the security key and code table data, wherein the code table data is stored in the security chip.

* * * * *